United States Patent Office 3,487,759
Patented Jan. 6, 1970

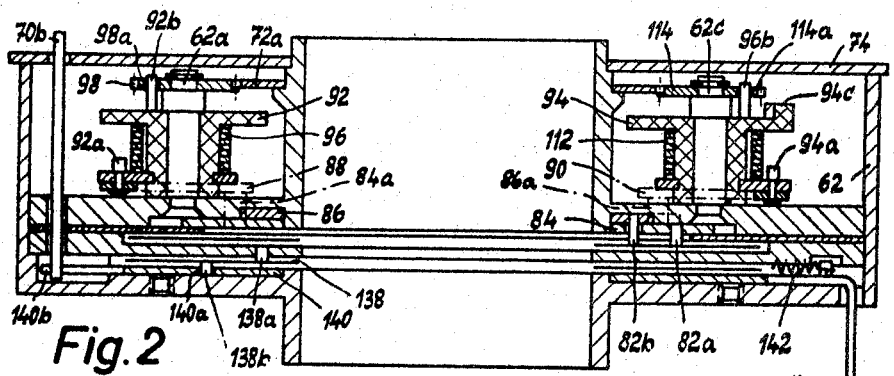
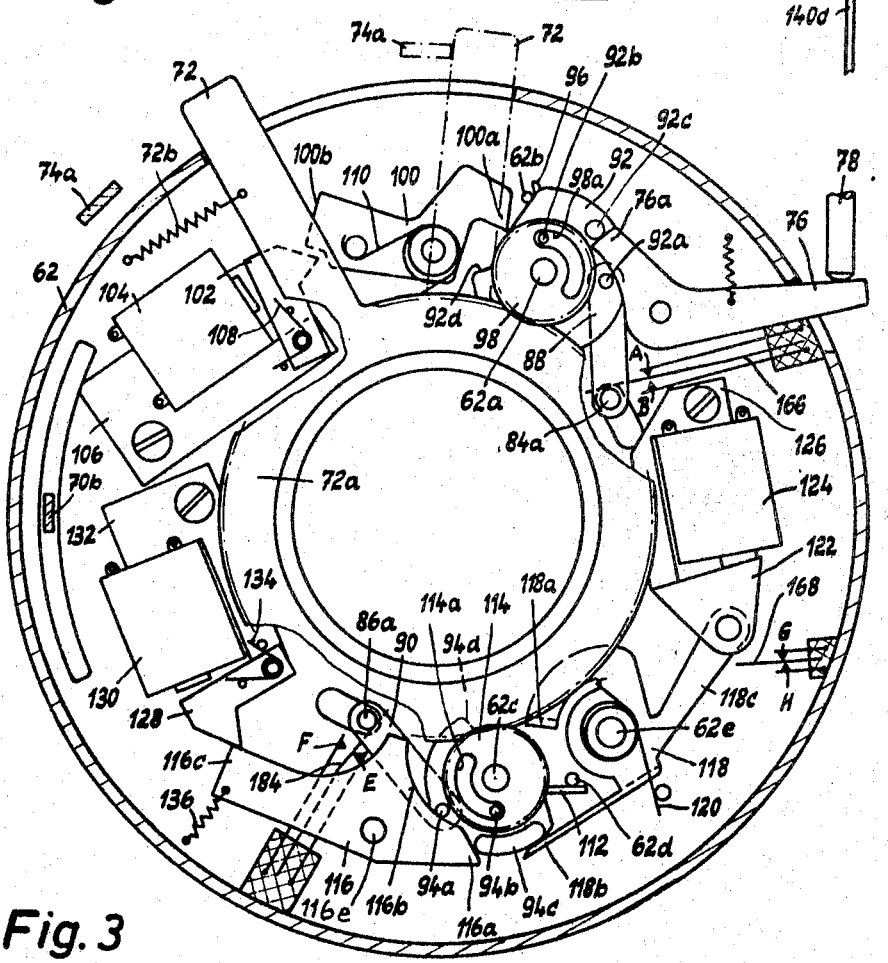

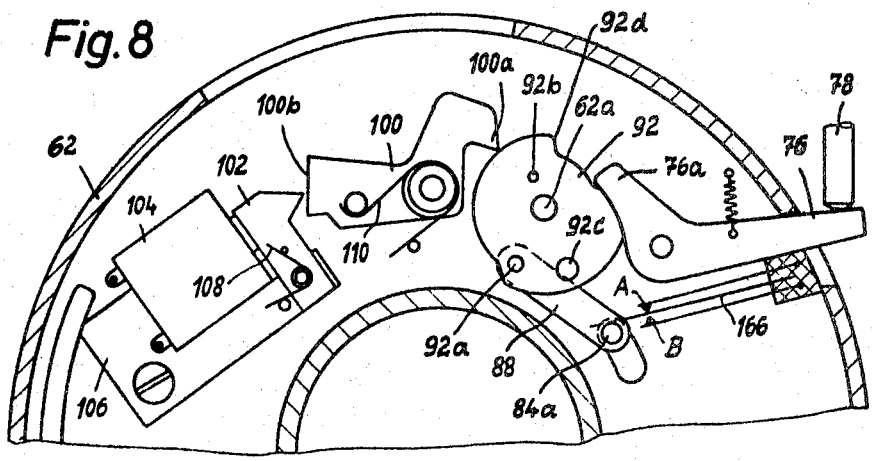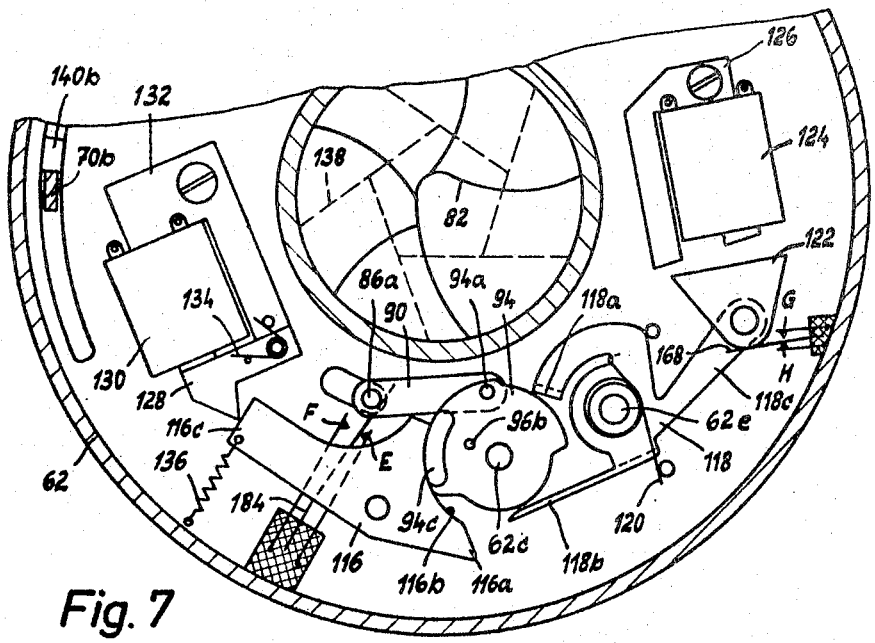

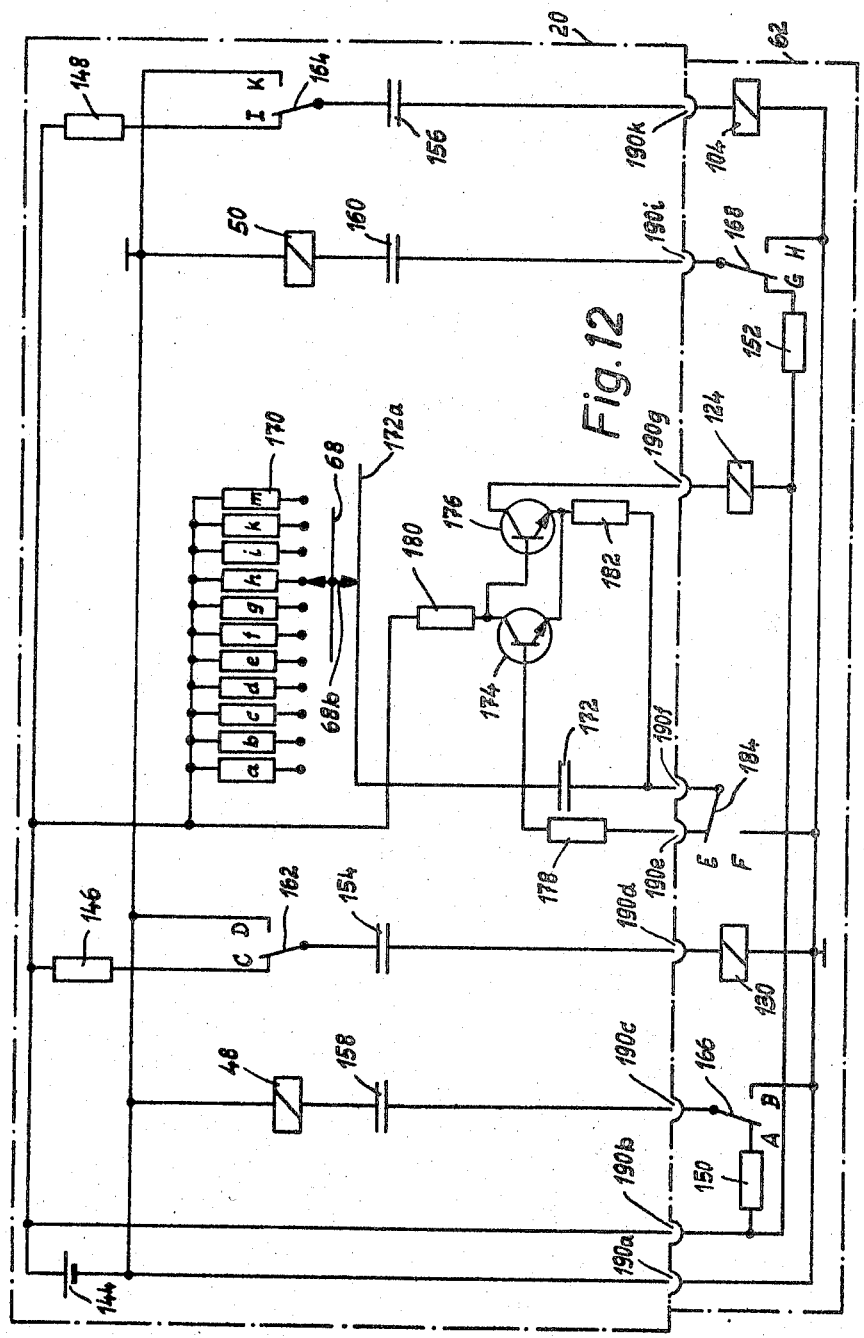

3,487,759
PHOTOGRAPHIC CAMERA
Paul Fahlenberg, Baierbrunn, near Munich, Germany, assignor to Compur-Werk Gesellschaft mit beschrankter Haftung & Co., Munich, Germany, a German firm
Filed Aug. 3, 1966, Ser. No. 569,959
Claims priority, application Germany, Aug. 30, 1965,
C 36,767
Int. Cl. G03b *19/12*
U.S. Cl. 95—42                                       8 Claims

ABSTRACT OF THE DISCLOSURE

A photographic camera of the single lens mirror reflex type having a shutter mechanism which is first cocked or tensioned and when released runs down under spring power. When the mechanism is cocked or tensioned, and then released, it runs down under spring power. The various moving mechanical parts operate electric switches in an electric circuit which controls not only the duration of exposure but also the sequence and timing of the necessary movements of mechanical parts. Certain of the mechanical parts being held in selected positions by latches which are released by energizing their respective electromagnets. When the shuter blades, initialiy open for viewing, are closed at the beginning of the exposure cycle, a switch is operated to release the latch which holds the mirror mechanism, so the mirror and an associated light shield swing up from viewing position to picture-taking position. As these parts leave the viewing position, a switch is actuated to activate a timing circuit. When these parts reach picture-taking position, another switch is actuated to release the shutter for an opening movement to start the actual exposure, and the blades are maintained open for the required length of exposure as determined by the timing portion of the electric circuit. The blades are then released for closing movement, whereupon a switch is actuated to release a latch which held the mirror mechanism in picture-taking position. The mirror mechanism then completes its run-down to move the mirror and associated light shield to viewing position, and when these parts reach viewing position, a switch is actuated to release a latch of the shutter mechanism so it can complete its run-down to open the shutter blades for viewing the next scene.

---

This invention relates to a photographic camera with a reflex mirror movable to and from a photographic image reflecting position, and with an objective shutter which can be established and maintained in open condition for interim inspection of said image, when the reflex mirror is in said image reflecting position.

An object of this invention is to provide a generally improved and more satisfactory photographic camera of this kind.

Another object is to provide for such a photographic camera with improved electro mechanical means for operating it.

Still another object is to provide an improved camera in which substantially all steps of the picture-taking sequence, after being initiated manually, are controlled in proper sequential order by electric circuit means.

These and other desirable objects are attained in the manner disclosed as an illustrative embodiment of the invention in the following description and in the accompanying drawings forming a part hereof, in which:

FIG. 2 is a cross section through the shutter forming part of the camera of FIG. 1;

FIG. 3 is a front view of the shutter with parts removed, and with most of the illustrated parts in cocked or tensioned position;

FIG. 7 is a view similar to FIG. 6, with the parts at a later point in the cycle, showing the shutter blades closed to terminate the exposure but not yet reopened for viewing;

FIG. 8 is a view similar to FIG. 5, showing the parts in the rest or run-down position at the end of the cycle, with blades fully open for viewing;

Figure 1:
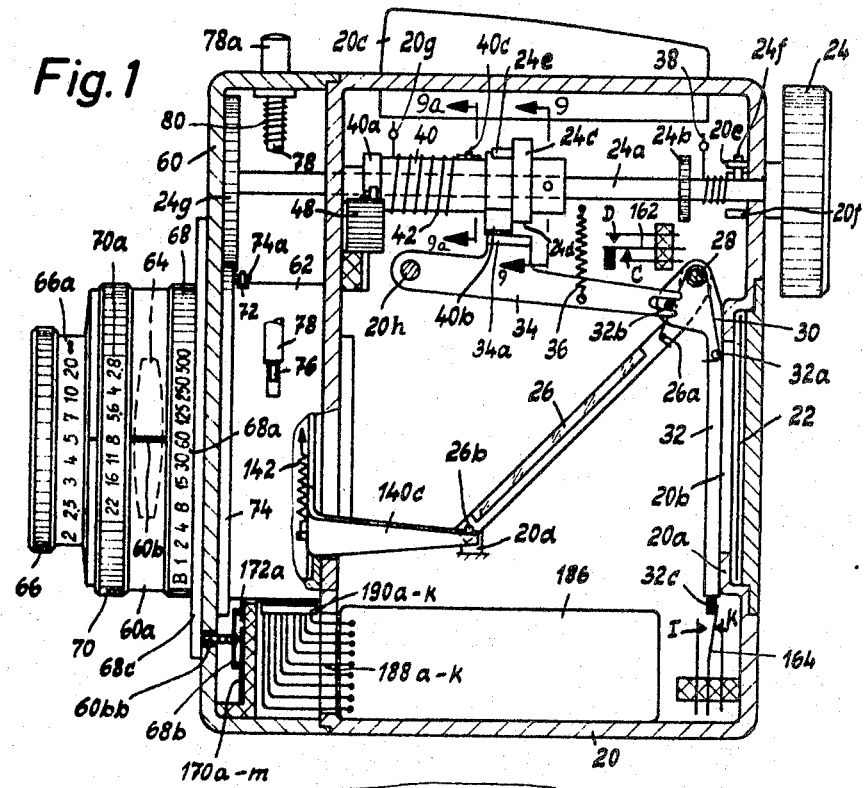
FIG. 1 is a longitudinal sectional view of a preferred specific embodiment of a photographic camera of this invention, in which view a portion of the camera housing has been removed to reveal inner structure.
Figure 9:
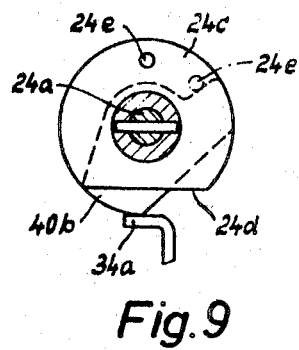
Figure 9A:
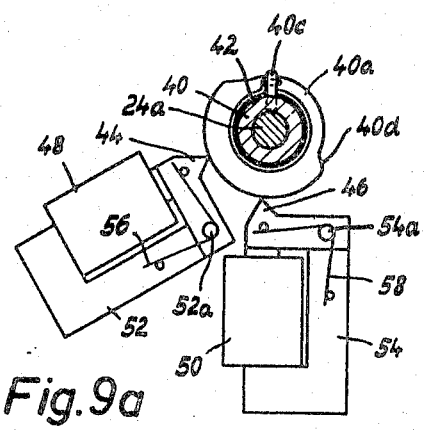
Figure 10:
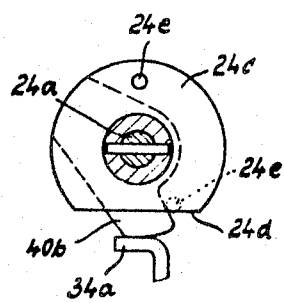
Figure 10A:
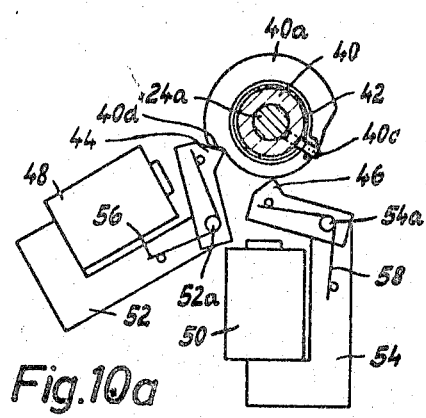
Figure 11:
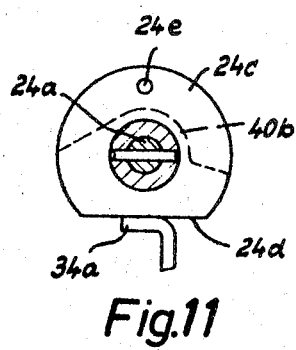
Figure 11A:
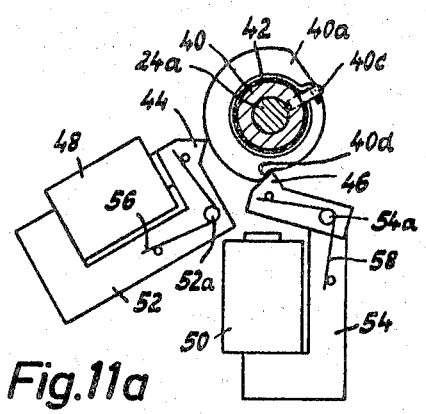

FIGS. 9 and 9a are cross sections taken substantially on the lines 9—9 and 9a—9a of FIG. 1 respectively, showing the parts in rest or run-down position;

FIGS. 10 and 10a are similar views showing the parts in cocked or tensioned position;

FIGS. 11 and 11a are similar views showing the parts at an intermediate point in the exposure cycle; and FIG. 12 is a schematic diagram of the electrical circuit involved in the camera of FIG. 1.

In greater detail, the drawings and particularly FIG. 1 illustrate a single lens reflex camera. It comprises a light tight, box-like, camera housing 20 having a front with an opening about the optical axis of the camera, and a back with a film strip guideway 20a having a picture window or exposure aperture 20b through which the optical axis passes. For the taking of photographs, a film strip 22 is disposed in the guideway 20a and the particular section of the film strip 22 to be exposed is brought to the area of the picture window 20b by the operation of conventional film feed mechanism (not shown). The film feed mechanism is driven by a film feed drive pinion 24b fastened to a rotatable, operating or main shaft 24a rotatably carried by the camera housing 20 generally parallel to the optical axis and extending outwardly rearwardly from the back of the camera housing 20 to provide an external portion to which an operating or winding knob 24 is secured. A conventional film rewind mechanism (not shown) is also present for winding up the film strip 22 when it has been completely exposed.

In the top of the camera housing 20 is a conventional horizontal focusing screen surrounded by an inspection frame 20c which forms a shadow box helping to keep lateral stray light from the focusing screen. Within the camera housing 20 there is a movable reflex mirror 26 which has an image reflecting position. In this position the reflex mirror 26 is disposed transversely to the optical axis between the opening in the front of the camera housing and the picture window 20b in the film guideway 20a, and in this position the reflex mirror 26 reflects toward the focusing screen carried by the inspection frame 20c light that enters through the opening. In the embodiment shown, the upper end of the mirror 26 is pivotally mounted on a relatively stationary, mirror support shaft 28 carried by the sides of the camera housing 20 and disposed transversely to, and spaced from, the optical axis. The camera housing 20 also comprises a mirror stop 20d against which the lower end of the mirror 26 bears when the mirror is in the image reflecting position and which prevents the lower end of the mirror from pivoting past the image reflecting position toward the back of the camera housing 20. By means of a mirror return spring 30 coiled about the mirror shaft 28 the mirror is constantly urged toward its image reflecting position. One end of the mirror return spring 30 bears against a lateral projection 26a on the mirror 26 while the other end bears against a lateral projection 32a on a light baffle flap or light shield 32 which normally covers the picture window 20b in the film guideway 20a. The upper end of the light shield 32 is rotatably carried also by the mirror support shaft 28. In addition, the upper portion of the light shield has a transversely disposed, lateral slide pin 32b which normally is slidably disposed between the upper and lower portion of the vertically bifurcated back end of a longitudinally disposed control lever 34. At the bottom end of the light shield there is a switch arm press member 32c.

The front end of the control lever 34 is pivotally mounted transversely to, and spaced from, the optical axis on a control lever support shaft 20h which is mounted in the camera housing 20. The control lever 34 has a laterally extending cam follower flange 34a between the pivoted end and bifurcated end. In addition, there is a control lever cam follower spring 36, which in the embodiment shown is a helical tension spring with one end secured to the mirror control lever 34 and the other end secured to a spring anchoring pin member of the camera housing 20. The cam follower spring 36 is positioned so as to urge the cam follower flange 34a and thus the bifurcated end of the control lever 34 upwardly or counterclockwise in the view of FIG. 1.

Inside the camera housing 20 and secured to the main shaft 24a is a control lever cam drive plate 24c. This plate comprises a circular segment radially perpendicular to the axis of rotation of the main shaft 24a and having a peripherally disposed flat spot 24d (see FIGS. 9–11) normally horizontally disposed and downwardly facing. Diametrically opposite the peripheral flat spot 24d the control lever cam drive plate 24 comprises a frontwardly extending sleeve drive pin 24e generally parallel to, but normally vertically spaced from, the axis of the main shaft 24a. The flat spot at the periphery of the drive plate 24 is normally positioned oppositely to the cam follower flange 34a on the control lever 34.

The main shaft 24a also carries a transversely disposed, turn limit pin 24f (see FIG. 1) while the back of the camera housing 20 has in the path of normal arcuate travel of the limit pin 24f relatively stationary beginning and end stops 20e and 20f. The beginning stop 20e defines the rest position of the winding knob 24 and operating shaft 24a, while the end stop 20f defines the limit of rotation of the main shaft 24a and thus of the turning knob 24 and the drive pin 24e. A main shaft return spring 38 coiled about the operating shaft 24a with one end secured to the camera housing 20 and the other end in engagement with the limit pin 24f urges the main shaft 24a counterclockwise when viewed from the rear, toward the rest position.

Disposed in rotatable fit on the shaft 24a is a sleeve 40 having at one end (the front end, in the embodiment shown) a radially extending locking flange 40a and at the other end a radial control lever cam 40b. Coiled about the sleeve 40 is a sleeve return spring 42 with one end secured to an anchor member 20g of the camera housing 20, and the other end of which is in engagement with an anchor pin 40c (see FIGS. 1 and 9a) which extends radially outwardly from the sleeve 40. The sleeve return spring 42 biases the sleeve in a counterclockwise direction when viewed from the rear of the camera.

The radial control lever cam 40b in cross section has substantially the outline as depicted in FIGS. 9–11. It comprises two oppositely disposed circular segments with radii substantially equal to the radius of the circular segment portion of the cam drive plate 24c, and a flat spot between the two segments having substantially the same chordal dimensions as the flat spot of the cam drive plate 24. One of the circular segments provides an abutment portion for engagement by the sleeve drive pin 24e. The control lever cam 40b in rest position is oriented relative to the cam drive plate 24c and sleeve drive pin 24e substantially as shown in FIG. 9. The cam follower flange 34a (see FIGS. 1 and 9) of the control lever 34, because of the cam follower spring 36, bears against the periphery of the radial cam 40b, except when the cam drive plate 24c presents to the cam follower flange 34a a peripheral surface of greater radius than the peripheral surface presented to the flange 34a by the cam 40b, and in such case it bears against the peripheral surface of the drive plate 24c.

The locking flange 40a in cross section has the configuration shown in FIGS. 9a–11a, that is, an arcuate peripheral surface followed by an abruptly inset arcuate peripheral surface. The abrupt inset forms a locking nose or latch catch 40d which coacts alternately with a cocked position latch 44 and an intermediate position latch 46. These latches are electromagnetically actuated by corresponding locking flange control electromagnets 48 and 50 (see FIGS. 1 and 9a–11a). The cocked position latch electromagnet 48 and the intermediate position latch electromagnet 50 in the embodiment shown are mounted on dielectric pads 52 and 54 respectively which are fastened to the camera housing 20 and which also carry pivot pins 52a and 54a on which the cocked position latch 44 and the intermediate position latch 46 are pivotally mounted. The two latches are pivotally urged by associated springs 56 and 58, respectively, toward the two arcuate peripheral surfaces of the locking flange 40a.

Certain aspects of the present invention deal with the electric control of the sequence of operative movements of the shutter and the mirror assembly in a single lens reflex camera, independently of the particular details of construction of the shutter. These aspects of the invention may be advantageously used regardless of the type of shutter. In the preferred form of the invention, however, the shutter is an objective shutter of the cocking or tensioning type and with diaphragm leaves which are opened wide for viewing the scene and are then closed down to a pre-set aperture for the exposure. A preferred example of such a shutter will be described below.

The camera shown in FIG. 1 also comprises a front cap 60 which is fastened to the camera housing 20. The front cap 60 has an opening about the optical axis. Disposed in the openings in the front cap 60 and the front of the camera housing 20 is the housing or casing 62 (see FIGS. 1 and 3) of an objective shutter. Extending frontwardly from the shutter casing 62 and front cap 60, and about the optical axis is a conventional tube or sleeve 60a containing a front lens component 64. Rotatably mounted on the tube 60a are a focus adjustment ring 66 with focusing scale indicia 66a, an exposure time adjustment ring 68 with time scale markings 68a and a diaphragm opening adjustment ring 70 with scale indicia 70a preferably graduated in the usual f numbers. The scales are read in conjunction with a fixed reference mark 60b on the tube or sleeve 60a or on any other suitable fixed part.

The objective shutter in the camera shown is of the cocking or tensioning type. It is cocked or tensioned by means of a cocking arm 72 (see FIGS. 1 and 3) on a tensioning ring 72a, cooperating with a driver arm 74a extending rearwardly from an outer cocking gear 74 (see FIG. 1) which is mounted for rotation around the shutter housing 62 and which is in gear engagement with an outer cocking gear drive pinion 24g fastened to the main shaft 24a.

The shutter has a shutter trip member 76 (see FIGS. 3 and 1) which projects laterally outwardly through an opening in the shutter casing 62 and which is engaged by a camera trip rod 78, only the end portions of which are shown in FIG. 1. Secured to the upper end of the trip rod 78 is a trip knob 78a which in rest position projects outwardly through an opening in the top of the front cap 60 and which is urged upwardly by a spring 80.

Figure 4:
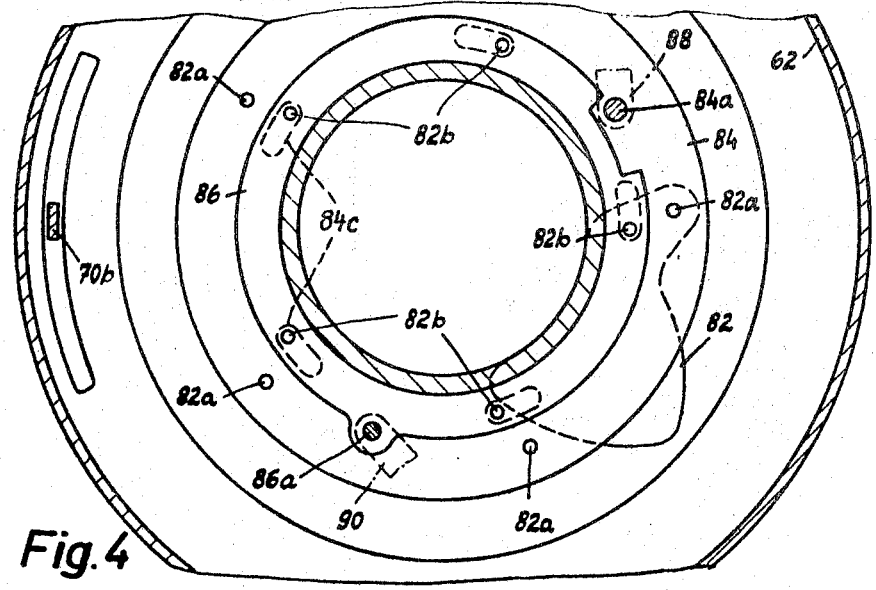
FIG. 4 is a transverse section through the shutter near the rear thereof, especially illustrating the blade driving rings and associated parts.

The shutter, as best seen in FIGS. 2–4, comprises a plurality of shutter blades 82, only one of which is shown in FIG. 4. Generally there are five blades, although more or less are within the broader concepts of this invention. The blades are arranged conventionally around the aperture on the optical axis. Each shutter blade 82 has a frontwardly extending radially outer pivot pin 82a which is normally rotatably disposed in a corresponding opening in a radially outer shutter blade ring 84. In addition, each shutter blade 82 has a forwardly extending pin 82b which passes freely through an enlarged slot 84c in the rear blade ring 84 and operatively engages a front blade ring 86 which lies in front of and is concentric with the blade ring 84. Preferably the pins 82b engage in conventional slots (not shown) in the ring 86.

Each of the two shutter blade driving rings 84 and 86 has a pin 84a and 86a, respectively, engaged by one end of a link 88 and 90, respectively. The other end of each of these links is pivotally connected to pins 92a and 94a, respectively, projecting rearwardly from the respective rear flanges of two rotary driving members 92 and 94, respectively, which may be referred to as driving plates or driving hubs or master members.

The first driving member 92 is rotatably mounted on a stationary pin 62a conveniently mounted within the shutter housing 62, this pin preferably being supported from a transverse mounting plate of a conventional kind, stationarily fixed within the housing and forming a support and guide for many of the other parts of the shutter. The driving member 92 is loaded or powered by a driving spring or master spring 96 which is coiled around the member 92 and is anchored at 62b, and which tends to drive the member 92 in a clockwise direction when viewed as in FIG. 3. For tensioning or cocking the driving member 92, in order to store power or energy in its driving spring 96, there is a toothed pinion 98 freely rotatable on the same pin 62a, and meshing with teeth on the periphery of a tensioning or cocking ring 72a rotatable concentrically about the optical axis and preferably bearing on the lens tube as shown in FIG. 2. This ring 72a carries a radial arm 72 which extends out through an arcuate circumferential slot in the housing as shown in FIG. 3 and is engaged, when the shutter is to be tensioned or cocked, by the ear or arm 74a on the previously mentioned tensioning gear 74 driven from the knob 24 and shaft 24a. The tensioning pinion 98 has an arcuate driving slot 98a concentric with the axis of rotation, in which is engaged a pin 92b projecting forwardly from the front flange of the driving hub member 92. In the position shown in FIG. 3, which represents the cocked or tensioned position of the driving member 92, it is seen that the pin 92b is in the counterclockwise end of the slot 98a, so the drving member 92 is free to turn in a clockwise direction, under the influence of its driving spring 96, without interference from the tensioning pinion 98. When the driving member 92 has rundown in a clockise direction to its limit or rest position, the pin 92b will be at the clockwise end of the slot 98a, and then a counterclockwise rotation of the tensioning pinion 98 will carry the member 92 counterclockwise with it, restoring it to its tensioned or cocked position.

Figure 5:
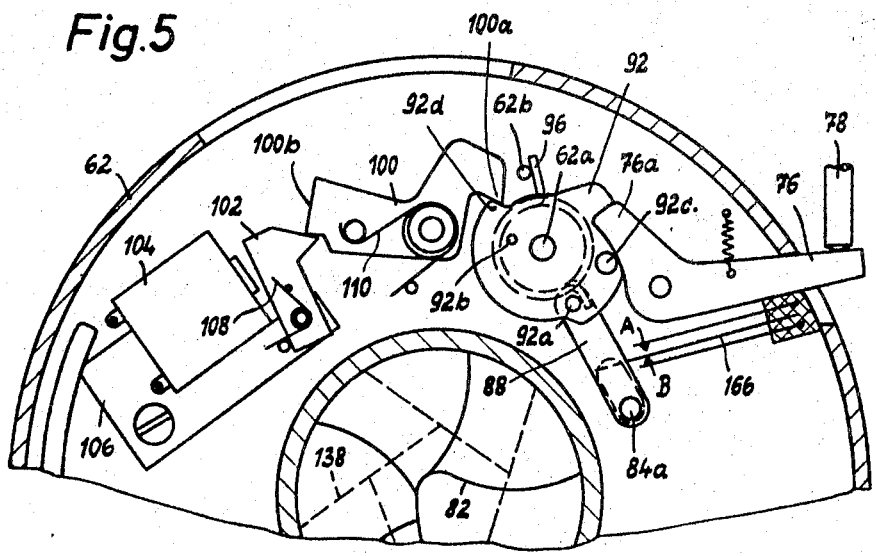
FIG. 5 is a view similar to the upper part of FIG. 3, showing the parts shortly after the shutter is tripped, with the blades closed to terminate the viewing and ready to be opened again to make the exposure.

In addition, the driving member 92 has a locking pin 92c which bears against the arm 76a of the shutter trip lever 76 when the driving member 92 is in the cocked or tensioned position. Moreover, the driving member 92 also has a locking cam formation or shoulder 92d at one point in its periphery, which cooperates with a nose 100a on a double-armed locking lever or latching lever 100 to hold the driving member 92 in an intermediate position as shown in FIG. 5. The second arm 100b of this latching lever 100 lies in the path of movement of the armature 102 of an electromagnet 104 which is mounted on an insulating plate 106 in the shutter housing 62. A spring 108 tends to move the armature 102 away from the magnet 104 into a latching position with respect to the lever 100. Another spring 110 tends to move the latching lever 100 in a clockwise direction, to press its first arm or nose 100a against the periphery of the driving member 92.

The second driving member or master member 94 previously mentioned is shown near the bottom of FIG. 3 and is rotatable on the stationary pin 62c, likewise mounted on the transverse mounting plate in the shutter housing. The member 94 is biased in a clockwise direction by the driving spring or master spring 112 wound around the member 94 and having its outer end anchored at 62d. Similarly to the tensioning arrangement for the first driving member 92, the second driving member 94 is cocked or tensioned by a tensioning pinion 14 rotatable on the pin 62c and having teeth in meshing engagement with the teeth on the tensioning ring 72a. The pinion 114 has a circumferential slot 114a in which is a pin 94b projecting forwardly from the driving member 94.

This second driving member 94 has a locking extension 94c which engages the first arm 116a of a three-armed locking lever or latching lever 116. The periphery of the driving member 94 also has a locking or latching cam portion or shoulder portion 94d which cooperates with a locking or latching nose 118a of a locking disk 118 which is rotatably arranged on a pin 62e in the shutter housing and which is biased in a clockwise direction by the spring 120. A projection 118b on the disk or plate 118 in engaged temporarily against the periphery of the driving member 94, while a further projection 118c thereon carries an armature 122 cooperating with the core of an electromagnet 124 secured to an insulating plate 126 in the shutter casing.

The second arm 116b of the latching lever 116 forms an abutment against which the latching extension 94c of the driving member 94 presses under certain operating conditions. The third arm 116c of the latching lever 116 lies within the range of a latching nose or projection on an armature 128 pivoted on a suitable stationary pivot in the shutter housing and cooperating with an electromagnet 130 secured to an insulating plate 132 in the shutter. A spring 134 biases the armature 128 in a direction away from the electromagnet 130 and into obstructing relation to the member 116. Another spring 136 biases the lever 116 in a counterclockwise direction on its pivot 116e.

The shutter casing 62 also comprises an iris diaphragm which can be of conventional construction. It comprises a plurality of diaphragm leaves 138 (see FIGS. 2, 5, and 7). Each diaphragm leaf (see FIG. 2) has a pivot pin 138a pivotally mounted in a stationary transverse plate in the shutter casing 62, and an aperture size setting pin 138b slidably seated in a corresponding control groove 140a of a diaphragm aperture control ring 140 rotatably mounted in the shutter casing 62. The diaphragm aperture control ring 140 is engaged by a spring 142 which urges the ring in the direction of rotation for minimum diaphragm aperture opening, which in this instance is a clockwise direction when viewed from the back of the camera or a counterclockwise direction when viewed from the front as in FIGS. 5 and 7. The diaphragm control ring 140 has a radially extending arm 140b which bears against an axially extending or longitudinal disposed bar 70b (FIGS. 2, 3, and 8) joined to the diaphragm aperture adjustment ring 70. The diaphragm control ring 140 also has a crank arm 140c (FIGS. 1 and 2) which projects radially and thence axially rearwardly through an opening in the shutter casing 62 into positive engagement with a pin 26b laterally projecting from the bottom end of the reflex mirror 26.

The solenoids of the electromagnets 48, 50, 104, 124 and 130 are part of an electrical control system, the layout of which is illustrated in FIG. 12. The power supply of the electrical control system in the embodiment shown is a battery 144. However, any other source of direct current (D.C.) whether inside or outside of the camera, can be employed, for example, a rectifier, or a D.C. generator or the like. In the embodiment shown the negative terminal of the D.C. power supply may be connected to the camera casing 20 and the shutter housing 62.

The electric circuit arrangement is well shown in FIG. 12, and will be readily understood by those skilled in the art with only a minimum of additional description. The previously described electromagnets and solenoids 48, 50, 104, 124, and 130 are connected to the source of current 144 in the manner shown in FIG. 12, and are charged through the various resistors 146, 148, 150, and 152 and through the capacitors 154, 156, 158, and 160, in a manner which will be readily understood from a study of FIG. 12. In the circuits are various switches 162, 164, 166, and 168, as illustrated, each switch having two positions, such as the contact positions A and B of the switch 166, contact positions C, and D, of the switch 162, positions E, and F of the switch 184, positions G, and H, of the switch 168, and positions I and K of the switch 164, all as clearly illustrated.

Also incorporated in this electrical control arrangement is an R-C member (or resistance-capacitor member) which regulates the sutter speed or exposure period of the shutter and which includes a regulating variable resistance and a capacitor 172. If it is desired to set the shutter speed automatically in accordance with the available illumination, the variable resistance may be a photo resistance, suitable photo resistances being well known in the photographic art. If the shutter speed is to be set manually rather than automatically, the variable resistance is preferably operatively connected to and set by the shutter speed setting ring 68 (FIG. 1). To this end, it preferably comprises a series of resistances of different values as shown at 170a through 170m, having separate terminals engaged by a slider 168b (FIG. 12) which is connected to and moved by the speed control member 68, and which slides also along a contact strip 172a connected to one side of the capacitor 172 so that the setting of the shutter speed setting member 68 serves to connect the capacitor 172 to any selected one (but only one at a time) of the resistors 170a through 170m. The slider 68b and the cooperating contact portions of the members 170a–m and 172a are shown schematically near the lower left corner of FIG. 1, which shows also that the slider 68b may be operatively connected to an insulating member firmly seated on an annular flange 68c fixed to and turning with the ring 68 and passing rearwardly through an arcuate slot 60bb in the front cap 60 of the camera.

The control arrangement also includes two feed back transistors 174 and 176, preferably of the NPN type, with associated forward resistors 178, 180, and 182, arranged as shown, and a changeover switch 184 having the two positions E and F previously mentioned.

Preferably the electric circuit arrangement is divided into two main parts, many of the parts being located within the camera housing 20 and being enclosed within the dash-dot line 20 in FIG. 12, while the remaining parts are located in the shutter casing or housing 62 and enclosed within the dash-dot line 62 in FIG. 12. The elements within the camera housing are, so far as possible, disposed on a carrier 186, seen near the bottom of FIG. 1, and are electrically connected to the elements which are within the shutter casing 62 by means of coupling conductors 188a through 188k and associated coupling pins 190a through 190k, illustrated schematically near the lower left corner of FIG. 1. The changeover switch 162 is arranged in the camera housing 20 in a position above the control lever 34, as shown in FIG. 1, and is operated by the control lever 34 in such manner that this switch 162 is in its C position when the control lever is swung down to put the mirror 26 in viewing position, and the switch is moved to the D postion when the control lever 34 is swung up to picture-taking or exposure-making position. The changeover switch 164, on the other hand, is located beneath the light baffle flap 32 and is moved by this flap, so as to be in the K position when the flap obstructs the passage of light to the film, and in the I position when the flap moves away from obstructing position to picture-taking position. The switch 166 is located in the shutter housing as shown in FIG. 3, in position to be operated by the pin 84a, and the switch 184 is likewise in the shutter housing, in position to be operated by the pin 86a. The switch 168 is also in the shutter housing 62, and is in position to be operated by the armature 122 of the electromagnet 124.

The operation of the camera and the associated control means is as follows: in FIGS. 1, 9, and 9a the parts are illustrated in the positions they occupy directly after an exposure has been completed, the part being in rest or run-down position and not yet tensioned or cocked ready for the next exposure. The viewing of the scene and the focusing of the camera can be performed either with the parts in this position, or after the tensioning or cocking operation, because the mirror 26 is in viewing position and the shutter blades and diaphragm leaves are fully open both in the rest or run-down position and in the tensioned or cocked position. In both of the positions just mentioned, the mirror 26 is in the reflecting position shown in FIG. 1, the flap 32 is in the film-protecting position also shown in FIG. 1, and the shutter blades 82 and diaphragm leaves 138 are fully open, as just mentioned. The focus for the next exposure can be set by turning the focusing ring 66 until the image is sharp on the focusing screen within the flange 20c.

Either before or after focusing, the camera is to be tensioned or cocked, which is accomplished by turning the knob 24 in a clockwise direction when viewed from the rear of the camera. As above indicated, this serves to feed or transport the film 22 to bring the next exposure area thereof to the exposure position behind the exposure aperture or window 20b.

During the tensioning rotation of the knob 24 and shaft 24a, the driver pin 24e is turned in a clockwise direction from the initial position or rest position shown in full lines in FIGS. 9, 10, and 11. There is a lost motion travel of the pin from the full line position of FIG. 9 to the dotted line position in the same view, and then when the dotted line position is reached, the pin 24e picks up the member 40b and moves this member from the position shown in FIG. 9 to the position shown in FIG. 10. In the initial position or run-down position shown in FIG. 9, one end of the member 40b engages the ear 34a of the control lever 34 and holds the control lever in a depressed position. On account of the lost motion travel of the pin 24e, this end of the member 40b will not leave the ear 34a until the periphery of the member 24C is in a position engaging the ear 34a, to continue to hold the control lever 34 in a depressed position notwithstanding the fact that one end of the member 40b moves away from the ear 34a. When the shaft 24a reaches the limit of its rotation in a clockwise direction, the pin 24e will have reached the dotted line position shown in FIG. 10, and this will have brought the opposite end of the member 40b down onto the ear 34a of the control lever 34, so that now this opposite end of the member 40b will hold the lever 34 in its depressed position notwithstanding the fact that the shaft 24a and the member 24c move back in a counter-clockwise direction to the initial position shown in FIGS. 9 and 10, where the flat spot 24d of the member 24c is opposite the ear 34a of the lever 34 and does not make contact with the lever. In this way, the mirror 26 and flap 32 remain in viewing position during the tensioning rotation of the knob 24 and also during the return movement of the knob 24 (under the influence of the spring 38) after the completion of the tensioning movement.

The clockwise tensioning movement of the member 40, imparted by the pin 24e, turns the forward end 40a of this member from the position shown in FIG. 9a to the position shown in FIG. 10a, in which position the latching armature 44 of the electromagnet 48 snaps behind the shoulder or abutment 40d of the member 40a, to hold this member in the tensioned or cocked position notwithstanding the force of the spring 42 tending to turn the member 40 back in a counterclockwise direction. Thus, until the electromagnet 48 is energized to withdraw the latch member 44, the member 40 will be held in its tensioned position.

At the same time that the clockwise rotation of the knob 24 and shaft 24a has served to transport the film and to tension or cock the member 40, it has also caused corresponding clockwise rotation of the gear 24g which, in turn, has caused rotation of the ring 74 in a direction which is counterclockwise when viewed from the rear of the camera or clockwise when viewed from the front. This has caused the arm 74a on the ring 74 to move counterclockwise when viewed from the rear, or clockwise when viewed from the front as in FIG. 3, thereby engaging the arm 72 on the tensioning ring 72a and moving this ring from the full line position shown in FIG. 3 to the dotted line position shown in the same view. This clockwise rotation of the ring 72a has, through its gear teeth, caused counterclockwise rotation of the tensioning pinions 98 and 114, thereby causing the clockwise end of the respective slots 98a and 114a to engage the respective pins 92b and 94b, to carry the two driving members or master members 92 and 94 in a counterclockwise direction from their respective run down positions to their respective tensioned or cocked position shown in FIG. 3. In such positions, the trigger latch 76a snaps behind the pin 92c on the driver 92, to hold it in tensioned position, and the end 116a of the latch lever 116 engages the projection 94c on the driver 94 to hold it in tensioned position, the latch member 116 in turn being held in this position by the armature latch 128, all as illustrated in FIG. 3.

The counterclockwise tensioning movement of the two driving members or master members 92 and 94 serves to pull the two links 88 and 90, respectively, causing counterclockwise movement of the two blade rings 84 and 86, respectively. It will be recalled that the shutter blades are fully open in the rest or run-down position of the shutter, and they remain open during the tensioning or cocking operation, notwithstanding the rotation of the blade rings 84 and 86, because these two blade rings are rotated simultaneously by the simultaneous cocking of the members 92 and 94. Therefore, during the cocking operation, the entire shutter blade assembly (blades themselves, plus blade rings) turns bodily as a unit about the optical axis as a center, without causing any swinging movement of the blades on their pivots.

When the operator lets go of the knob 24 at the conclusion of the tensioning movement, the spring 38 restores the knob 24 and shaft 24a in a counterclockwise direction (viewed from the rear) to the rest position determined by contact of the pin 24f (FIG. 1) with the stop member 20e, and thus the tensioning ring 74 is also restored to its initial or rest position, allowing the spring 72b (FIG. 3) to restore the tensioning gear 72a from the dotted line position shown in FIG. 3 to the full line position in the same view, thereby turning the tensioning pinions 98 and 114 to the positions shown in FIG. 3, where they will not interfere with the running-down movements of the driving members 92 and 94. As already stated, these members 92 and 94 are held in their respective tensioned positions by the latches 76 and 116. The member 40 (FIGS. 1, 10, and 10a) is also held in its tensioned position notwithstanding the return movement of the shaft 24a, by the latch 44. Thus the power spring 42 of the member 40 remains loaded or powered.

The camera is now ready for the next picture, or for such adjustments as the operator may wish to make with regard to focus, diaphragm aperture, or shutter speed. In the tensioned or cocked condition of the parts, as well as in the run-down condition existing immediately prior to the tensioning operation, the diaphragm leaves and the shutter blades are fully open and the mirror is in viewing position, so that the next view can be selected and necessary adjustments made either before or after turning the knob 24 to tension the camera ready for the next exposure.

The operator now presses the trip or release plunger 78, thereby turning the trigger latch 76 (FIG. 3) in a clockwise direction on its pivot, releasing the nose 76a therof from the pin 92c of the driving member 92. This permits the driving member 92 to start its running down movement in a clockwise direction under the power of the driving spring 96, thereby pushing on the link 88 and moving the blade ring 84 in a clockwise direction relative to the other blade ring 86 which remains stationary at this time. Thereby, due to the relative motions of the two blade rings, the shutter blades 82 are swung from open position to overlapping closed position, to prevent entrance of light into the camera. The running-down movement of the driving member 92 is stopped approximately midway of its total range of movement, by engagement of the latch nose 100a on the latch 100 with the abutment or shoulder 92d on the driving member 92, stopping the movement of the driving member in the position shown in FIG. 5.

Meanwhile, right at the beginning of the running down movement of the driving member 92, the first part of the movement of the pin 84a has relieved the pressure on the spring-biased electric switch 166, shifting the switch from the A position to the B position. Referring now to FIG. 12, it will be seen that while the switch was in position A, the capacitor 158 was charged from the battery 144 through the resistor 150. But when the switch is shifted to the B position, the capacitor 158 is discharged through the electromagnet 48. The core of this electromagnet now attracts its armature 44, which previously latched the member 40, thereby permitting the parts 40, 40a and 40b to turn counterclockwise under the power of the spring 42, from the tensioned position shown in FIGS. 10 and 10a to the intermediate position shown in FIGS. 11 and 11a, in which intermediate position the parts are stopped by the latching armature 46. The turning movement of the part 40b from the tensioned position of FIG. 10 to the intermediate position of FIG. 11, withdraws one end of this member from cooperative relation to the ear 34a of the lever 34, thereby allowing the lever 34 to be swung upwardly by its spring 36, as a result of which the light baffle flap 32 and the mirror 26 are swung upwardly about the axis 28, by the action of the control lever 34 on the pin 32b. During the upward swinging of the mirror, the pin 26b thereon relieves its downward pressure on the arm 140c of the diaphragm control ring, thereby allowing the spring 142 to turn the diaphragm control ring in a closing direction, to close the diaphragm down to whatever aperture has been pre-selected and set on the diaphragm setting ring 70. The diaphragm setting ring 70 is provided with the usual click stops or other suitable means for holding it in set position until purposely moved therefrom, and thus the arm 70b on the diaphragm setter 70 acts as an adjustable stop or abutment in the path of travel of the arm 140b (FIGS. 2 and 7) determining the extent to which the spring 142 can turn the diaphragm control ring 140, thereby causing the diaphragm to assume its pre-selected aperture.

Figure 6:
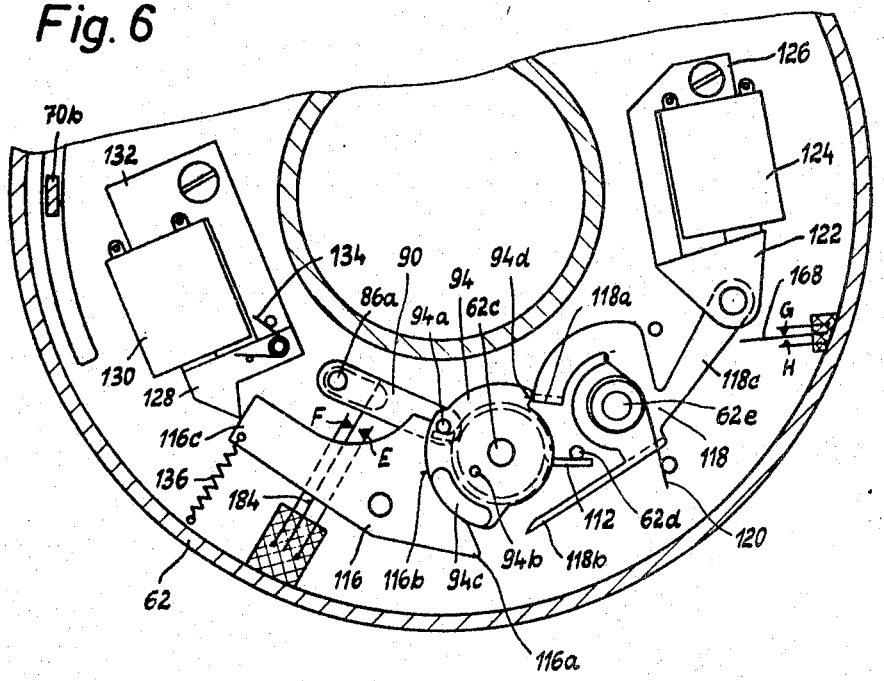
FIG. 6 is a view similar to the lower part of FIG. 3, showing the parts with the blades fully open during the exposure.

While the parts were in the viewing position, the switch 164, spring biased to the I position, was held in the K position by the pressure of the part 32c at the bottom edge of the flap 32. As soon as the flap 32 begins to move away from its protective position toward the picture-taking position, the pressure on the switch 164 is relieved and the switch closes to the I position, thus allowing the capacitor 156 to be charged. Near the end of the upward swinging movement of the mirror and flap, the upward movement of the control lever 34 moves the switch 162 from its spring-biased C position to its D position, so that the previously charged capacitor 154 is now discharged through the electromagnet 130, so that the magnetic core thereof attracts the armature 128 from the position shown in FIG. 3 to the position of such armature shown in FIGS. 6 and 7, thereby releasing the latching lever 116. The force exerted by the master spring 112, tending to turn the master member 94 and thereby pressing the part 94c of the master member against the nose 116a of the latching lever 116, is therefore able to cam or thrust the latching lever 116 aside, against the light power of its spring 136, so that the master member 94 can run down from its tensioned or cocked position shown in FIG. 3 to the intermediate position shown in FIG. 6, in which position it is temporarily stopped by engagement of the shoulder 94d on the master member with the latch part 118a. During this partial running down movement from tensioned position to intermediate position, the rotation of the master member 94 pushes on the link 90, thereby turning the blade ring 86 in a counterclockwise direction when viewed from the front, and opening the shutter blades to start the actual exposure.

At the commencement of movement of the blade ring 86, the pin 86a relieves the pressure on the electric switch 184 which is spring biased to the F position but which was held in the E position by the pressure of the pin 186a. As a result, the parts 172–182 of the transistor assembly have operating voltage applied thereto, and will operate in the known manner. As a result of such operation, current now flows through the electromagnet 124 causing it to retain the armature 122 in the position shown in FIG. 6, thereby maintaining the latch 118 in the position there illustrated, preventing the master member 94 from completing its running down movement from the latch intermediate position to the ultimate rest position. This holds the shutter blades open, for as long as the master member is held in its intermediate position.

After a specific time of charging of the capacitor 172, determined by the pre-selected regulating resistance (in the example illustrated in FIG. 12, the resistor 170h) current ceases to flow through the electromagnet 124 and it becomes deenergized, so that the armature 122 can be withdrawn from the magnetic core of the electromagnet, and the latch plate or member 118 can now move further in a clockwise direction under the influence of its spring 120. This releases the latching portion 118a from the abutment portion 94d of the master member 94, and the master member can now resume its clockwise running-down movement under the influence of its master spring 112. This further movement of the master member from its intermediate position to its final rest position pulls on the link 90 and turns the blade ring 86 in a counterclockwise direction, again closing the shutter blades to terminate the photographic exposure. This position of the parts, just as the blades are closed, is illustrated in FIG. 7.

Toward the end of this closing movement of the blade ring 86, its pin 86a engages the switch 184 and moves it back from its F position to its E position, as a result of which the above mentioned transistor connections are cut off from the battery 144 and the discharge of the capacitor 172 is initiated. Simultaneously, the dropping of the armature 122 away from the core of the electromagnet 124 causes the armature to engage the switch 168 and move this switch from its spring biased G position to its other H position, thereby discharging the capacitor 160 through the electromagnet 50.

When the electromagnet 50 is energized, the core of the latter attracts the latching armature 46 which, it will be remembered, served as a latch to hold the parts 40, 40a, and 40b in the intermediate position shown in FIGS. 11 and 11a. Thus the electromagnet 50 releases the latch 46 and allows the parts 40, 40a, and 40b to resume their running down movement from the intermediate position shown in FIGS. 11 and 11a to the final rest position shown in FIGS. 9 and 9a. As a result, one end of the part 40b engages the ear 34a on the control lever 34 and swings the control lever down into the position shown in FIG. 1, thereby moving the mirror 26 down from picture taking position to viewing position, and moving the protective flap 32 down to its film protecting position. The downward motion of the mirror causes the pin 26b thereon to engage the arm 140c of the diaphragm control ring 140, opening the diaphragm up to maximum aperture ready for viewing.

At the beginning of the downward swinging movement of the control lever 34, the upward pressure on the electric switch 162 is relieved, thus opening the switch from the position D and closing it to its spring biased position C, charging the capacitor 154 ready for the next exposure operation or cycle.

When the protective flaps 32 reaches its closed or protecting position, the portion 32c thereof finally shifts the changeover switch 164 from its I position to its K position, thereby discharging the previously charged capacitor 156 through the electromagnet 104. The core of the electromagnet 104 now attracts the armature 102, which is previously held in the position shown in FIG. 5, and this position of the latch 102 held the driving member 92 in its intermediate position shown in FIG. 5. But now that the armature 102 is attracted by the electromagnet, it moves to the unlatching position shown in FIG. 8, allowing the latching lever 100 to be thrust aside (against the force of its light spring 110) by the power of the spring powered driving member 92, so that the latter can now complete its running down motion from the intermediate position shown in FIG. 5 to the final rest position shown in FIG. 8. During this completion of the running down motion of the member 92, it pulls on the link 88, thereby moving the blade ring 84 in a counterclockwise direction to open the shutter blades again, for viewing purposes. The final part of this opening motion of the blade ring 84 causes the pin 84a to shift the switch 166 from the B position to the A position, thereby again charging the capacitor 158 ready for the next cycle of operation.

The scene or view for the next photograph can now be composed and necessary adjustments made, either before or after the operator turns the knob 24 to tension or cock the parts ready for the next exposure. The exposure cycle itself can then be initiated by depressing the trigger plunger 78, any time after the tensioning operation has been performed.

In this application, the terms "power storage means" and similar terms, when used without further qualification, are intended to be interpreted broadly as comprising both mechanical and electrical storage means. Thus the various power springs such as 42, 96, and 112 constitute power storage means in which power is stored when the springs are tensioned or cocked. Also the various electrical capacitors such as 154–160 constitute power storage means in which power is stored when the respective capacitors are charged.

It is seen from the foregoing disclosure that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. A photographic camera of the type including a reflex mirror pivotally mounted for swinging between a viewing position and a picture-taking position, and an objective shutter having parts movable to open the shutter for viewing and to close the shutter at the conclusion of viewing and to open and close the shutter to make a picture-taking exposure, said camera further comprising and being characterized by an electric circuit switching system including electronic elements, and means controlled by said switching system for swinging said mirror and for opening and closing said shutter in functionally correct sequence, further including at least one power storage means for implementing the opening and closing movements of said shutter, latching members for retaining said power storage means in preselected operative positions, and electromagnets operatively arranged in said switching system for releasing said latching members to allow said power storage means to move said shutter at appropriate times, characterized by the fact that said switching system includes a resistor-capacitor arrangement the resistance value of which is variable and is adapted to determine the lapse of time between the energization of two different electromagnets and thus determine the period of exposure.

2. A camera as defined in claim 1 characterized by the fact that variation of said resistance value may be performed manually.

3. A camera as defined in claim 1, characterized by the fact that variation of said resistance value may be performed by a photoresistance.

4. A photographic camera of the type including a reflex mirror pivotally mounted for swinging between a viewing position and a picture-taking position, and an objective shutter having parts movable to open the shutter for viewing and to close the shutter at the conclusion of viewing and to open and close the shutter to make a picture-taking exposure, said camera further comprising and being characterized by an electric circuit switching system includngi electronic elements, and means controlled by said switching system for swinging said mirror and for opening and closing said shutter in functionally correct sequence, wherein said camera includes a trigger adapted to be actuated to initiate an exposure cycle, and wherein said electric circuit switching system includes a first switch (166) operated as a result of actuation of said trigger and effective upon such operation to initiate movement of said mirror from viewing position to picture-taking position, a second switch (162) operated when said mirror reaches picture-taking position and effective upon such operation to initiate opening movement of said shutter, a third switch (184) operated upon opening movement of said shutter and effective upon such operation to activate exposure duration timing means to hold said shutter open for an interval, and a fourth switch (168) operated at the conclusion of said interval and effective upon such operation to initiate movement of said mirror from picture taking position to viewing position.

5. A camera as defined in claim 4, further including a film-protecting light shield movable concomitantly with said mirror between a viewing position and a picture-taking position, and means for opening said shutter for viewing between successive exposures, said electric circuit switching system further including a fifth switch (164) operated upon return movement of said light shield from picture-taking position to viewing position and effective upon such operation to cause said opening means to open said shutter for viewing.

6. A photographic camera of the type including a reflex mirror pivotally mounted for swinging between a viewing position and a picture-taking position, and an objective shutter having parts movable to open the shutter for viewing and to close the shutter at the conclusion of viewing and to open and close the shutter to make a picture-taking exposure, said camera further comprising and being characterized by an electric circuit switching system including electronic elements, means controlled by said switching system for swinging said mirror and for opening and closing said shutter in functionally correct sequence, at least one power storage means for moving said mirror, latching members for retaining said power storage means in preselected functional positions, electromagnets operatively arranged in said switching system for releasing said latching members to allow said power storage means to move said mirror at appropriate times, an opening knob, an operating shaft turned by said knob, a lost motion coupling between said shaft and said power storage means, and control cam formations associated with said operating shaft and said power storage means for controlling movement of said mirror.

7. A camera as defined in claim 6, wherein said operating shaft has a latching formation thereon, a plurality of latches for latching said shaft in a plurality of different posiitons, and a plurality of electromagnets in said electric circuit switching system for unlatching said latches at different times.

8. A photographic camera of the type including a reflex mirror pivotally mounted for swinging between a viewing position and a picture-taking position, and an objective shutter having parts movable to open the shutter for viewing and to close the shutter at the conclusion of viewing and to open and close the shutter to make a picture-taking exposure, said camera further comprising and being characterized by an electric circuit switching system including electronic elements, means controlled by said switching system for swinging said mirror and for opening and closing said shutter in functionally correct sequence, first power storage means tending to close said shutter at the conclusion of viewing and to open the shutter after a picture-taking operation for another viewing, second power storage means tending to open the shutter for a picture-taking exposure and then to close it again, third power storage means tending to cause movement of said mirror from viewing position to picture-taking position and then back to viewing position again, a first latch member for holding said first power storage means in an initial shutter-open position, a second latch member for holding said first power storage means in an intermediate shutter-closed position, a third latch member for holding said second power storage means in an initial position in which said shutter is closed when said first power storage means is in its intermediate position, a fourth latch member for holding said third power storage means in an initial position wherein said mirror is in viewing position, a fifth latch member for holding said third power storage means in an intermediate position wherein said mirror is in pic-taking position, manual means for releasing said first latch member to initiate a picture-taking cycle of operation, and means operated and controlled by said electric circuit switching system for releasing the other latch members in proper sequence to cause successively said shutter to close, said mirror to move from viewing position to picture-taking position, said shutter to open and close again to make an exposure, said mirror to move from picture-taking position to viewing position, and said shutter to open again for viewing.

References Cited

UNITED STATES PATENTS

| | | | |
|---|---|---|---|
| 3,122,078 | 2/1964 | Singer | 95—42 |
| 3,324,779 | 6/1967 | Tsukumo Nobusawa et al. | 95—42 |
| 3,336,852 | 8/1967 | Levin | 95—53 |
| 3,362,311 | 1/1968 | Singer | 95—53 |

NORTON ANSHER, Primary Examiner

RICHARD L. MOSES, Assistant Examiner

U.S. Cl. X.R.

95—53